US006863372B2

(12) United States Patent
Barckhahn et al.

(10) Patent No.: US 6,863,372 B2
(45) Date of Patent: Mar. 8, 2005

(54) PRINTER DEVICE AND METHOD

(75) Inventors: Christian Barckhahn, Sant Cugat del Valles (ES); Elizabeth Zapata, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/634,503

(22) Filed: Aug. 5, 2003

(65) Prior Publication Data

US 2004/0027401 A1 Feb. 12, 2004

Related U.S. Application Data

(63) Continuation of application No. 09/984,930, filed on Oct. 31, 2001, now Pat. No. 6,655,782.

(51) Int. Cl.[7] .................................... B41J 2/145
(52) U.S. Cl. ................... 347/41; 347/3; 347/12
(58) Field of Search ............... 347/3, 12, 41, 347/101; 355/53, 67; 358/1.1, 1.2

(56) References Cited

U.S. PATENT DOCUMENTS

| 5,982,475 A | | 11/1999 | Bruning ................ 355/53 |
| 6,012,792 A | | 1/2000 | Sievert et al. ............ 347/3 |
| 6,109,745 A | * | 8/2000 | Wen ..................... 347/101 |
| 6,120,141 A | | 9/2000 | Tajika et al. ............ 347/96 |

* cited by examiner

Primary Examiner—Stephen D. Meier
Assistant Examiner—Lam Nguyen

(57) ABSTRACT

A method of printing an image with an inkjet printer system, said system comprising a printhead arranged to print swaths of image content parallel to a first axis on a print medium, said swaths having a width in a second axis substantially perpendicular to said first axis, said method comprising the steps of: determining the length of said image in said second axis; and, resizing said image such that said resized length of said image in said second axis is substantially an integer multiple of said swath width.

13 Claims, 2 Drawing Sheets

PRINTER DEVICE AND METHOD

This is a continuation of application Ser. No. 09/984,930, filed Oct. 31, 2001, now U.S. Pat. No. 6,655,782.

FIELD OF THE INVENTION

The present invention relates generally to a printer device employing a scanning printing head, but particularly, although not exclusively, to a method of increasing the throughput of an inkjet printer device and the corresponding apparatus.

BACKGROUND OF THE INVENTION

Inkjet printer devices generally incorporate one or more inkjet cartridges, often called "pens", which shoot drops of ink onto a page or sheet of print media. For instance, two earlier thermal ink ejection mechanisms are shown in U.S. Pat. Nos. 5,278,584 and 4,683,481, both assigned to the present assignee, Hewlett-Packard Company. The pens are usually mounted on a carriage, which is arranged to scan across a scan axis relative to a sheet of print media as the pens print a series of individual drops of ink on the print media forming a band or "swath" of an image, such as a picture, chart or text.

Inkjet printers are generally arranged to print in a variety of print modes that offer differing trade-offs between print quality and throughput. In high throughput modes, the print media may be advanced relative to the carriage by a distance equal to the height of a swath once a given swath is printed. In this manner, a further swath may then be printed adjacent to the earlier swath. By a repetition of this process, a complete printed page may be produced in an incremental manner.

Over recent years, the importance placed on the throughput of ink jet printers has risen dramatically. Throughput is generally measured as the number of pages of a given size, or the area of print media that a printer may ink in a given time. Consequently, manufacturers of inkjet devices have embarked on a process of continually improving their inkjet printers to give improved throughput in order to secure a competitive edge in the marketplace.

Throughput is directly related to the speed at which each swath may be printed. Therefore, in order to enable higher throughputs, inkjet devices have been developed to print at higher carriage speeds, thus allowing more swaths to be printed in a given time. However, as the carriage speed increases above a certain point, the print quality tends to deteriorate. In many cases, it is therefore preferable to print images of higher quality at a lower throughput than lower quality images at a higher throughput. Consequently, inkjet printers are being continually redeveloped to use printheads having increasingly large swath heights. By using printheads with larger swath heights, fewer swaths are needed to print a given print job. Thus, throughput may be increased.

However, even with the advent of printheads with a swath height of approximately an inch, and the prospect of printheads with significantly greater swath heights being available in the future, the demand for yet further increases in throughput remains. This is particularly true as inkjet technology is now being used or considered for use in fields traditionally dominated by other technologies.

It would therefore be desirable to provide an improved inkjet device and a method of operating an inkjet printer that addresses the problems of the prior art.

SUMMARY OF THE INVENTION

According to the present invention there is provided a method of printing an image with an inkjet printer system, said system comprising a printhead arranged to print swaths of image content parallel to a first axis on a print medium, said swaths having a width in a second axis substantially perpendicular to said first axis, said method comprising the steps of: determining the length of said image in said second axis; and, resizing said image such that said resized length of said image in said second axis is substantially an integer multiple of said swath width.

It frequently arises that the length in the direction perpendicular to the scan axis of an image to be printed is a non-integer multiple of the swath height of the printheads. This is often the case irrespective of the how wide (i.e. the distance across the image in the direction perpendicular to its length) the image is. This generally means that only a fraction of the swath height of the printheads remains to be printed in the last pass of the printheads over the print medium. The inventors of the present invention realised that in such cases, it is possible to significantly increase the speed with which an image or page could be printed by resealing the image so as to avoid printing a final partial swath.

In a preferred embodiment of the invention, the image is rescaled, or resized, such that the length of the rescaled image is an integer multiple of the swath height of the printheads of the printer. Preferably, the size of the image is reduced such that the reduced image length is equal to the largest integer multiple of the swath height which may be divided into the original image length. That is to say that the difference between the original image length and the reduced image length is equal to the swath height of the partial swath that would normally be printed if the image were not rescaled.

In this manner, the number of swaths required to print the image is reduced by one. Thus, the time taken to print the image may be correspondingly reduced. Generally, the time taken to print a partial swath is the same as the time taken to print a swath of full height. Therefore, if an image may be printed in few swaths, the degree to which the throughput may be increased in this manner may be very significant. Thus, in general, the invention is well suited to printers having a large swath height, and furthermore to printers having a swath height that is large in relation to the length of an image to be printed in the direction of the swath height.

The throughput advantages of the present invention are particularly beneficial in devices required to print many images, or copies of an image, rapidly. For example, wherein the inkjet device is being used in the role of the printing engine of a photocopier, or a workgroup printer.

The present invention also extends to the apparatus corresponding to the method. Furthermore, the present invention also extends to a computer program, arranged to implement the method of the present invention.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE INVENTION

There will now be described, by way of example only, the best mode contemplated by the inventors for carrying out the invention. The following embodiments use single pass, bi-directional print modes. However, the skilled reader will appreciate that the present invention may also be used to advantage in unidirectional printmodes and/or printmodes having a different number of passes.

System of the First Embodiment

Figure 1:
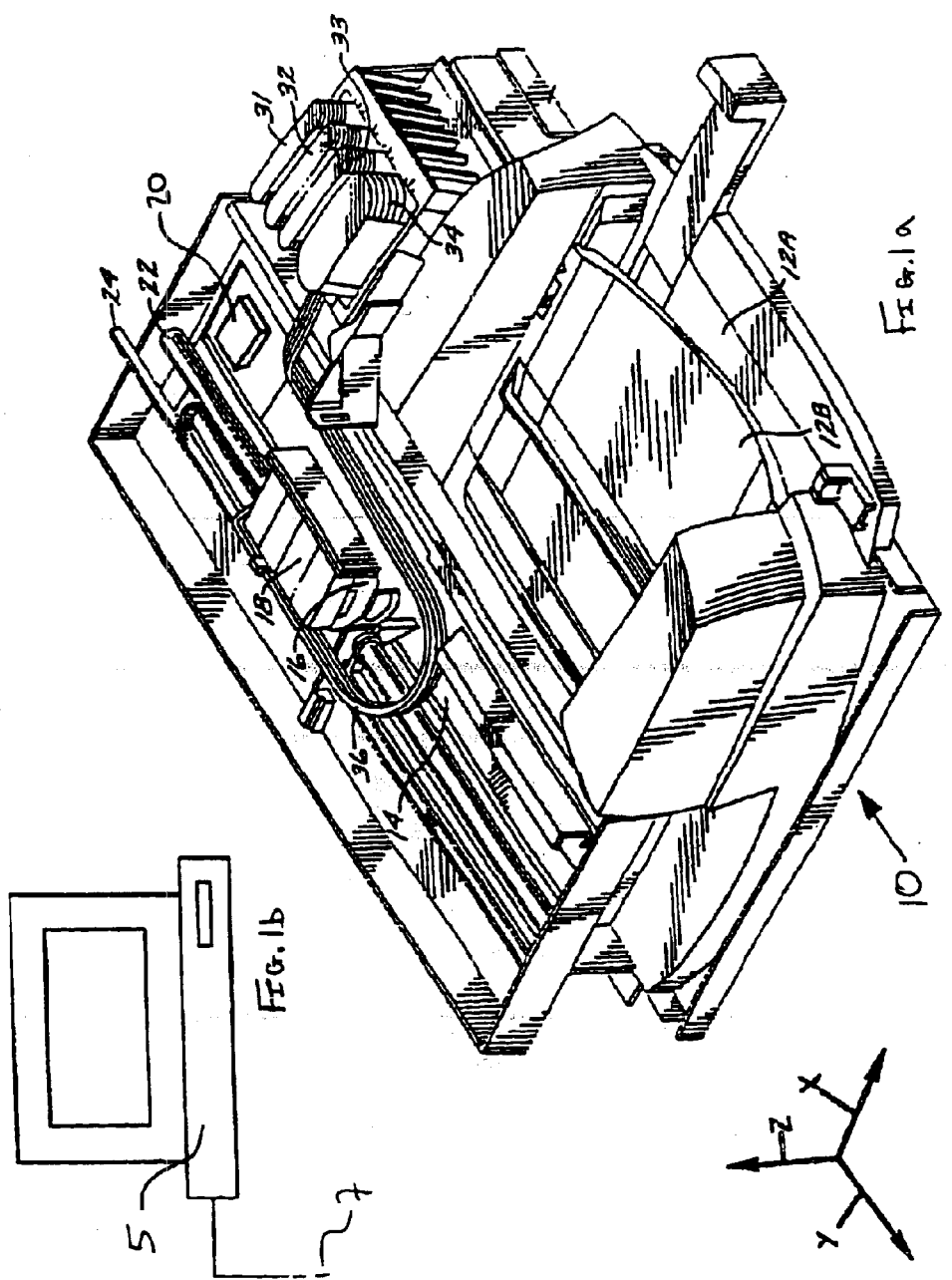
FIG. 1a shows a perspective view of an inkjet printer incorporating the features of the present invention.
FIG. 1b shows a schematic view of a conventional personal computer with which the printer of FIG. 1a may be used.

FIG. 1 illustrates an exemplary embodiment of an inkjet printer 10, with its cover removed, which is suitable for use with the present invention. The printer 10 may be used for printing conventional engineering and architectural drawings, as well as high quality photographs or posters. Commonly assigned U.S. Pat. No. 5,835,108, entitled "Calibration technique for misdirected inkjet printhead nozzles", describes an exemplary system which can employ aspects of this invention and the entire contents of which are incorporated herein by reference.

The printer 10 has a printer controller 20, illustrated schematically as a microprocessor that receives instructions from a host device, which is typically a computer, such as a personal computer 5 or a computer aided drafting (CAD) computer system, schematically illustrated in FIG. 1b. The printer 10 is connected to the personal computer 5 using a conventional connection 7. The personal computer 5, as is conventional, has a processor and a memory (not shown). Loaded in the memory of the personal computer 5 is commercially available application software for processing text or images to be printed by the printer 10 and a printer driver program for driving the printer 10.

The printer controller 20 has associated memory (not shown), which includes ROM and RAM. Image data, which is downloaded from a host device, may be stored in the RAM prior to being printed. The ROM stores operating instructions, which the printer controller 20 accesses in order to carry out the functions of the printer.

When a printing operation is initiated, a sheet of paper is fed into the printer using a conventional sheet feeding mechanism from a tray 12a which is arranged to hold an input supply of paper (not shown) or other print media such as transparencies and the like. The sheet is then brought around in a U direction to travel in the opposite direction towards the output tray 12b. The sheet is then stopped in a print zone 14 in order to allow a printing operation to be performed.

The printer has a scanning carriage 16, containing one or more print cartridges 18, that are arranged to scan (in the Y-axis) across a sheet of print media in order to print a swath of ink thereon. As is customary in the art, each of the four print cartridges 18 are positioned in the carriage 16 such that the swath printed by each cartridge 18 coincides with that of the other 3 print cartridges 18. However, the skilled reader will appreciate that the present invention may also be applied with benefit to printers having different pen arrangements. For example, printers which have more than one pen of a given colour, which are offset (i.e. staggered) in the media feed direction; thus, giving a combined swath height of that colour that is greater than the height of a single pen of that colour.

The carriage scanning mechanism may be conventional and generally includes a carriage guide rod 22, defining a scanning axis, along which the carriage 16 scans, a coded strip 24, which is optically detected by a photo-detector associated with the carriage 16 for precisely positioning the carriage 16. A conventional carriage drive motor (not shown), such as a stepper motor, is connected to the carriage 16 via a conventional drive belt and pulley arrangement may be used to propel the carriage 16 across the print zone 14.

After a single scan or multiple scans, the sheet is incrementally fed in the X-axis by a stepper motor and feed rollers or other conventional print media handling system (not shown) to advance the sheet of print media to a further position in the printzone 14.

The carriage position in the Y-axis and the position of the print media in the X-axis is output to the print controller 20. In this manner, the print controller 20 may generate control signals causing the carriage assembly 16 to be moved in the Y-axis and the print media to be moved in the X-axis, such that the print cartridges 18 may print ink at any desired location on the printing area of the print medium.

In this manner the carriage 16 then scans across the sheet a further time, printing a further swath; thus building up a completed image. When the printing on the sheet is complete, the sheet is forwarded to a position above the tray 12b, held in that position in order to ensure that the ink is dry and then released.

The illustrated printer 10 uses an "off-axis" ink delivery system having replaceable ink supply cartridges 31–34, located "off-axis" from the path of printhead travel. The ink from the ink supply cartridges 31–34 is conveyed through a conventional flexible tubing system 36 to the respective print cartridges 18. In this manner, only a small ink supply is propelled by the carriage drive motor across the printzone 14.

Each of the print cartridges 18, or "pens", has a printhead, each printhead having an orifice plate with a plurality of nozzles formed therethrough, through which drops of ink may be selectively ejected to form an image on a sheet of print media, in a conventional manner. In the present embodiment, each of the cartridges 18 is arranged to print one of the following colour inks: cyan; magenta; yellow and black. The print cartridges 18 have a large print swath (i.e. the height of the band of ink that may be printed in one pass of the printhead), about 25 millimetres (about one inch) wide, although cartridges with different swath heights may also be used.

In the present embodiment, the printheads are thermal inkjet printheads, although other types of printheads may be used, such as piezoelectric printheads.

Method of Operation of the First Embodiment

Figure 2:
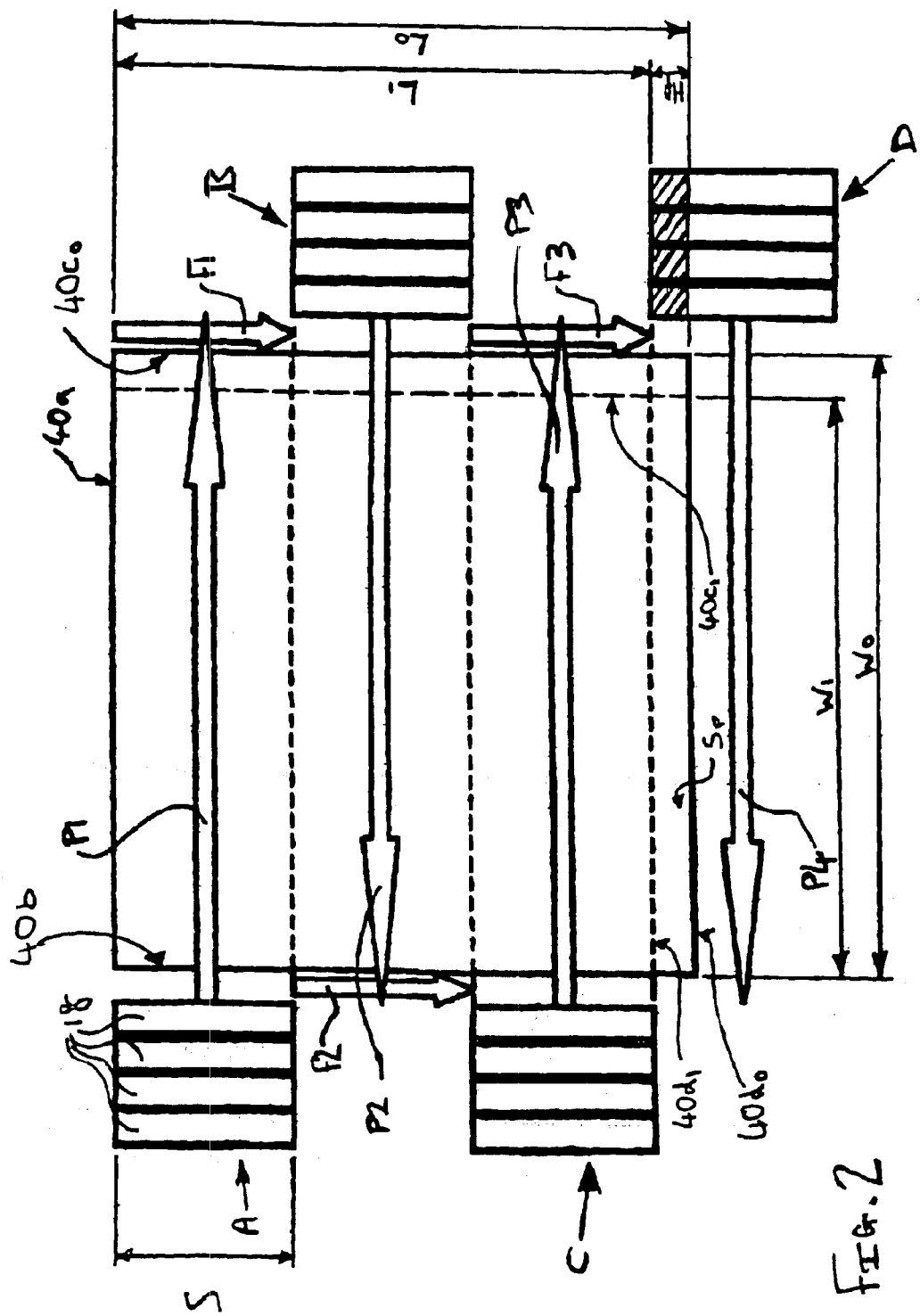
FIG. 2 schematically illustrates the mode of operation of an embodiment of the invention.

Referring to FIG. 2, the operation of the present embodiment of the invention will now be described.

For the sake of ease of explanation, FIG. 2 illustrates both the method of the present embodiment and a method of the prior art, with which the method of the present embodiment will be contrasted. Thus, FIG. 2 illustrates a schematic plan view of the outline of an exemplary, original (i.e. non-rescaled) image, as it would be printed by a prior art printer. Also illustrated in the figure is a similar outline view of the same image when rescaled and printed on the sheet of print media in the print zone 14 of the printer 10 in the method of the present embodiment.

The original image has upper, left, right and lower boundaries, which are labelled 40a, 40b, 40$c_0$ and 40$d_0$, respectively. The rescaled image shares the upper and left boundaries 40a, 40b with the original image and has right and lower boundaries that are labelled, $40c_1$ and $40d_1$, respectively. For the sake of clarity, the printer carriage 16 and further components of the printer 10 have been omitted from the figure.

As has been stated above, in the present embodiment, the printer 10 is configured to print in a single pass, bi-directional print mode. Therefore, a given image is printed in a series of parallel swaths, printed in alternating directions, with each swath being printed in a separate pass over the print medium. These passes are illustrated by the arrows which are sequentially referenced P1–P4. After each swath is printed, the print medium is advanced in a direction parallel to its length in a conventional media feed operation relative to the four print cartridges 18. The media feeds are represented in the figure by the arrows referenced F1–F3. Each media feed operation advances the print medium a sufficient distance such that the subsequent swath will accurately abut the previous swath; i.e. without there being a significant space or overlap between adjacent swaths. Thus, the distance that the print media is advanced in each the media feed operation is equal to the swath height "S" of the four print cartridges 18. The position of the image being printed, relative to the four print cartridges 18, at the start of each pass is indicated by the sequential relative positions of the four print cartridges 18, which are labelled "A", "B", "C" and "D".

The original image has a width "$W_o$", which is aligned parallel to the scan axis of the printer. The original image also has a length "$L_o$", which is aligned perpendicular to the scan axis of the printer. As can be seen from the figure, the relationship between the original image length "$L_o$" and the swath height "S" of the four print cartridges 18 means that the original image may be printed on the sheet in a series of four swaths. However, as can be seen from the figure, the last swath $S_p$ to be printed in the pass P4 is only a partial swath, printed by those nozzles in the shaded area of the four print cartridges 18 shown in position "D".

According to the present embodiment, the printer driver in the personal computer 5 determines the original length "$L_0$" of the image to be printed. The printer driver in the personal computer 5 then calculates the optimum amount, if any, by which the image should be rescaled. In the present embodiment, the original image is rescaled such that the rescaled image $L_1$ is reduced relative to original image length $L_0$ by the height $H_f$ of the partial swath $S_p$. In this manner, the length of the rescaled image $L_1$ is equal to an integer number of the swath height "S" of the print cartridges 18. In particular, in the present embodiment, length of the rescaled image $L_1=INT(L_0/S)$. In other words, $L_1$ is the interger value of ($L_o/S$).

The image is then rescaled in the printer driver of the personal computer 5. The rescaling is carried out using a conventional rescaling algorithm or process such as are employed in "fit to page" processes. "Fit to page" algorithms are well understood in the art of printing from personal computers, for example. In particular, current commercially available computer graphics software applications and printer drivers for personal computers use such standard techniques.

In the present embodiment, the width of the image is rescaled in proportion to the image length, thus preserving the original aspect ratio of the image. Therefore, in the present example, the rescaled image has a reduced width $W_1$, as shown in the figure, compared to the unreduced width $W_0$ of the unscaled image.

The printer driver in the personal computer 5 then divides the rescaled image data to be printed into the calculated integer number of swaths. This is carried out using a standard "swath processing" technique as is well understood in the art of inkjet printing. In the present example, the image is divided into three equal swaths.

Prior to commencing printing, print medium is correctly positioned to receive the first swath when printing starts, using a conventional print media feed.

The three swaths, indicated by arrows "P1", "P2" and "P3" are then printed in a conventional manner, with conventional media feed operations, F1 and F2, being performed in between the printing of the first and second and second and third swaths, respectively.

Thus, in the example, it is not necessary to print the fourth swath, as would be the case when using the prior art method. Therefore, by rescaling the image as described in the present embodiment, the time that would have been spent printing the fourth swath in the pass P4 may be saved. Additionally, the time which would be taken in carrying out the media feed operation, represented by the arrow F3, preceding the fourth swath of the prior art method, may also be saved. The skilled reader will appreciate that this additional time saving is not inconsiderable. The reason for this is that in order to correctly position the print media prior to the printing of the fourth swath, an accurate media feed operation must be used in order to avoid any misalignment between the third and fourth swaths. Generally, in order to feed the print media accurately, it must be fed slowly.

The skilled reader will appreciate that the present embodiment may be applied to the printing of images of varying dimensions. Thus, in the case of a printer according to the present invention that has a swath height of 1 inch, which is to print an image having a rescaled length of 6.0 inches and original length of 6.2 inches, six swaths will be required to print the image instead of seven which would normally be required. In this case, the throughput would be increased by a factor of $1/7$; i.e. approximately 14%.

The skilled reader will also appreciate that the present embodiment is applicable to a range of print mode qualities having varying numbers of passes. For example one, two, three, or four pass printmodes. However, the skilled reader will appreciate that printmodes having a higher number of passes would also benefit from the application of the present invention.

Further Embodiments

In the above description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

For example, although the above-described embodiment was described with reference to a printer device arranged to print a print file received from a host device, such as a PC, the skilled reader will appreciate that present invention is not limited to such configurations. For example, the present invention may be used in a document copier or a photocopier where a printer with a scanning printhead, such as an inkjet printhead, is used as the printing engine.

The skilled reader will appreciate that the exact implementation of such an embodiment will differ slightly from that described in the embodiment above, although the principal of operation is the same. For example, whereas in the above-described embodiment the scaling function was carried out in a printer driver associated with a personal computer, in a stand alone photocopying device this function would be preferably be implemented by a processor associated with the photocopier device.

Additionally, the skilled reader will realise that a photocopying device will scan a preset area, for example, of the size of a sheet of A4 paper to generate an image which may subsequently be reproduced by printing. Often, the useful information (i.e. that which is required to be copied) occupies a smaller area than the preset area that is being scanned. In such an embodiment, it would be possible to treat the entire scanned area as the "image" to be printed. If this were done, then any scaling that is required may be performed on the scanned area. However, in such a case, the useful or desired image portion may be further reduced in size each time that a copy is made of a copy itself produced using this method. Therefore, it would be preferable in such an embodiment to differentiate between the image in the scanned area and the background. Such differentiation techniques, sometimes termed "boundary box" techniques are conventional in the field of scanners. In the case of textual information, this result may also be achieved using commercially available optical character recognition techniques. In this manner, the dimensions of the useful image data may be established and reduced as required according to the same principles as described with regard to the above-described embodiment, whilst the dimensions of the background, or scanned area may be ignored.

Furthermore, the skilled reader will appreciate that although the above-described embodiment was described with reference to a desk-top inkjet printer, it will be understood that the present invention may be applied to a wide range of printers; such as wide format printers, copiers, and facsimile machines.

Although the above-described embodiment described the printing of an image on to a pre-cut sheet of print media, the skilled reader will appreciate that in practice roll supplied print media may also be used.

The skilled reader will also appreciate that in practice, the functions carried out by the printer driver in the above-described embodiment, especially with regard to determining the degree of rescaling required and the subsequent fit to page functions, could be carried out by the processor 20 of the printer. This is a particularly suitable implementation for use with commercial printers, such as some large format printers, which have large amounts of memory and processing power.

Regarding the way in which an image is rescaled in the present invention, the skilled reader will appreciate that various modifications to the above-described embodiment could be made. For instance, the resealing function could be applied to an image along its length only; i.e. not rescaling the width of the image. This would of course change the aspect ratio of the image. However, in certain situations, this may not be perceived to be a disadvantage. Furthermore, the invention could be implemented such that the reduction in size of an image allowed the number of swaths required to print the image to be reduced by more than one; thus giving rise to further increases in throughput. The exact trade off between the size of the printed image and the resulting throughput could be manually selected by the user in dependence upon individual requirements. Additionally, in some situations, it may be preferable instead of resealing the image, simply to not print the partial swath. Thus, in this embodiment of the invention, the image would essentially be "cropped" to give the required throughput increase. In this embodiment, there may be no need to rescale or crop the image along its width. However, this may be done in the event that it is desired to preserve the original aspect ration of the image, for example.

The skilled reader will appreciate that the method of the above-described embodiment may be selected or deselected manually by an operator. Alternatively, it may be selected automatically by a processor associated with the hardware of the system (located either in the printer, or associated computer), based, on predetermined selection criteria. One such predetermined selection criteria could be the swath height of the partial swath. For example, if the height of the partial swath is less than 50% of the maximum swath height then the method of the embodiment may be automatically implemented. However, if the height of the partial swath is more than 50% of the maximum swath height then the method of the embodiment may be automatically deselected.

What is claimed is:

1. A method of printing an image with an inkjet printer system, said system comprising a printhead arranged to print swaths of image content parallel to a first axis on a print medium, said swaths having a width W in a second axis substantially perpendicular to said first axis, said method comprising the steps of:

determining the length L of said image in said second axis;

determining the number of swaths required to print said image; and, if said determined number is not an integer number, resizing said image such that said resized image length in said second direction is substantially equal to INT (L/W).

2. A method according to claim 1, further comprising the step of scanning said image prior to the step of determining said length L of said image in said second axis.

3. An inkjet printer device that uses the method according to claim 1.

4. A system according to claim 3, further comprising an associated host device, such as a personal computer.

5. An inkjet printer system comprising a scanning printhead being arranged to print swaths of image content on a print medium in a first direction, said swaths having a width in a second direction substantially perpendicular to said first direction, said system being arranged to determine the number of swaths required to print an image and, if said determined number is not an integer, to resize said image such that said resized image may be printed with an integer number of complete swaths.

6. An inkjet printer system comprising a printhead arranged to print swaths of image content on a print medium in a first direction, said swaths having a maximum width W in a second direction substantially perpendicular to said first direction, said system being arranged to print an image having a length L in said second direction, said system being further arranged to determine the number of maximum width swaths required to print said image, and if said determined number is not an integer number, to resize said image such that said resized image length is substantially equal to INT (L/W).

7. A method of printing an image with an inkjet printer system, said system comprising a printhead arranged to print a number of swaths of an image parallel to a first axis on a print medium, said swaths having a width in a second axis substantially perpendicular to said first axis, said method comprising the steps of:

determining the number of swaths required to print an image;

resizing the image if the determined number of swaths is not an integer; and printing said resized image.

8. A photocopier apparatus comprising, an inkjet printer system, wherein the inkjet printer system comprises, a printhead being arranged to print swaths of image content on a print medium in a first direction, said swaths having a width in a second direction substantially perpendicular to said first direction, said printer system being arranged to determine the number of swaths required to print an image and, if said determined number is not an integer, to resize said image such that said resized image may be printed with an integer number of complete swaths.

9. A photocopier apparatus according to claim 8, wherein said image has an length L in said second direction prior to being resized, and said swath width is W, said system being arranged to resize said image such that said resized image length is substantially equal to INT (L/W).

10. A photocopier apparatus according to claim 8, wherein said system comprises an inkjet printer device.

11. A computer readable medium on which is embedded at least one computer program, said program implementing a method of printing an image with an inkjet printer system, wherein said system comprises a printhead arranged to print swaths of image content parallel to a first axis on a print medium, said swaths having a width W in a second axis substantially perpendicular to said first axis, said at least one computer program comprising instructions for:

determining the length L of said image in said second axis;

determining the number of swaths required to print said image; and if said determined number is not an integer number, resizing said image such that said resized length of said image in said second axis is substantially equal to INT (L/W).

12. The computer readable medium according to claim 11, said at least one computer program further comprising a set of instructions for scanning said image prior to the step of determining said length of said image in said second axis.

13. The computer readable medium according to claim 12, said at least one computer program further comprising a set of instructions for differentiating between said scanned image data and the background of the scanned area and carrying out the steps of determining said length of said image in said second axis and resizing said image in respect of said scanned image data.

* * * * *

UNITED STATES PATENT AND TRADEMARK OFFICE
CERTIFICATE OF CORRECTION

| | | |
|---|---|---|
| PATENT NO. | : 6,863,372 B2 | Page 1 of 1 |
| APPLICATION NO. | : 10/634503 | |
| DATED | : March 8, 2005 | |
| INVENTOR(S) | : Christian Barckhahn et al. | |

It is certified that error appears in the above-identified patent and that said Letters Patent is hereby corrected as shown below:

In column 2, line 19, delete "resealing" and insert -- rescaling --, therefor.

In column 7, line 64, delete "resealing" and insert -- rescaling --, therefor.

In column 8, line 31, in Claim 1, delete "INT" and insert -- the integer value of --, therefor.

In column 8, line 59, in Claim 6, delete "INT" and insert -- the integer value of --, therefor.

In column 9, line 2, in Claim 7, after "and" insert -- , --.

In column 9, line 16, in Claim 9, after "resized," delete "and".

In column 9, line 18, in Claim 9, delete "INT" and insert -- the integer value of --, therefor.

In column 10, line 3, in Claim 11, after "instructions" delete "for." and insert -- for: --, therefor.

Signed and Sealed this
Third Day of July, 2012

David J. Kappos
*Director of the United States Patent and Trademark Office*